United States Patent [19]

Nishida

[11] Patent Number: 4,520,781
[45] Date of Patent: Jun. 4, 1985

[54] IGNITION CONTROL SYSTEM OF INTERNAL COMBUSTION ENGINE

[75] Inventor: Minoru Nishida, Himeji, Japan

[73] Assignee: Mitsubishi Denki Kabushiki Kaisha, Tokyo, Japan

[21] Appl. No.: 414,955

[22] Filed: Sep. 3, 1982

[30] Foreign Application Priority Data

Sep. 16, 1981 [JP] Japan ................................ 56-147533
Sep. 16, 1981 [JP] Japan ................................ 56-147534
Sep. 16, 1981 [JP] Japan ................................ 56-147535

[51] Int. Cl.³ .............................................. F02P 5/04
[52] U.S. Cl. .................................... 123/414; 123/416; 123/479
[58] Field of Search ............... 123/416, 415, 417, 414, 123/479

[56] References Cited

U.S. PATENT DOCUMENTS

| | | | |
|---|---|---|---|
| 3,927,648 | 12/1975 | Kawai et al. | 123/416 |
| 4,112,895 | 9/1978 | Habert | 123/416 |
| 4,157,699 | 5/1979 | Mori | 123/416 |
| 4,266,518 | 5/1981 | Nishida | 123/416 |
| 4,317,437 | 3/1982 | Lindgren | 123/416 |
| 4,352,345 | 10/1982 | Menard | 123/416 |
| 4,370,962 | 2/1983 | Hosaka | 123/479 |
| 4,377,996 | 3/1983 | Yamaguchi | 123/416 |

Primary Examiner—Ronald B. Cox
Attorney, Agent, or Firm—Lowe King Price & Becker

[57] ABSTRACT

An ignition control system of an internal combustion engine comprises spark plugs (21a to 21d), a spark plug driving means (15 to 20 and 22), a rotational angle position signal generating means (1 to 5), an ignition enabling signal generating means (6 to 14), and an ignition enabling means (23 to 27). The ignition enabling signal generating means is adapted to make predictive evaluation of the succeeding ignition timing based on the pulse signals (P₁ and P₂) obtained from the rotational angle position signal generating means, thereby to generate a pulse signal (R). The ignition enabling means enables the pulse signal (R) to be applied to the spark plug enabling means only during the ignition timing range allowable for the engine. The spark plug enabling means is responsive to the pulse signal (R) to cause ignition by the spark plugs. Accordingly, abnormal ignition is prevented from occurring even when the pulse signal (R) is generated at an abnormal timing due to deviation of predictive evaluation due to an abrupt change of the rotational speed of the engine and the like.

8 Claims, 16 Drawing Figures

| ADDRESS | ROTATIONAL SPEED N (rpm) | ADVANCED ANGLE Θ (deg) |
|---|---|---|
| 0 | LESS THAN 600 | 0 |
| 1 | 650 | -2.5 |
| ¦ | ¦ | ¦ |
| ¦ | 1000 | -2.5 |
| ¦ | ¦ | ¦ |
| ¦ | 1500 | 10 |
| ¦ | ¦ | ¦ |
| n | MORE THAN 3000 | 20 |

IGNITION CONTROL SYSTEM OF INTERNAL COMBUSTION ENGINE

BACKGROUND OF THE INVENTION

1. Field of the Invention

The present invention relates to an ignition control system of an internal combustion engine. More specifically, the present invention relates to an ignition control system of an internal combustion engine adapted for predictive evaluation of ignition timing by the use of a microcomputer.

2. Description of the Prior Art

An ignition control system employing a microcomputer capable of adjusting ignition timing with ease and accuracy has been recently put into practical use as an ignition control system of an internal combustion engine such as a gasoline engine and the like. An example of such a system is disclosed in U.S. Pat. No. 4,157,699 issued June 12, 1979 to Yasunori Mori. The example relates to an improvement in an electronic spark timing advancing apparatus. The above described United States patent is incorporated herein by reference thereto. Nevertheless, for facility of understanding of the background of the invention, an example of a conventional ignition control system will be described in the following to the extent necessary for such purposes. For simplicity of description, a description will be made in the following of an ignition control system of a 4-stroke cycle engine with four cylinders by way of an example of an internal combustion engine; however, it is pointed out that the same be applied to other types of engines.

FIG. 1 is a block diagram showing an outline of a conventional ignition control system employing a microcomputer. Briefly described, the ignition control system shown comprises spark plugs, a spark plug driving means, a rotational angle position signal generating means, and an ignition enabling signal generating means.

The rotational angle position signal generating means comprises a disc 1 and position sensors 2 and 3 provided associated with the disc 1. The disc 1 is coupled to a crank shaft of an internal combustion engine, not shown. The disc 1 is provided with detectable members 4 and 5 provided on the periphery thereof spaced apart from each other by 180°, i.e. at directly opposite positions on the periphery. The position sensors 2 and 3 are provided in the vicinity of the periphery of the disc 1 and spaced apart from each other by 90°. The position sensors 2 and 3 serve to detect the positions of the detectable members 4 and 5 and may comprise proximity switches of an oscillator type including an oscillator, for example. In the case where the position sensors 2 and 3 are proximity switches of an oscillator type, the detectable members 4 and 5 may each comprise a protrusion of metal such as an iron piece. The disc 1 is rotated in the arrow direction in syncrhonism with the rotation of the engine at the same rotational speed as that of the engine. As a result, a pulse signal $P_1$ is obtained from the position sensor 2 and a pulse signal $P_2$ is obtained from the position sensor 3. In this case, each of the pulse signals $P_1$ and $P_2$ is obtained four times per two rotations of the disc 1. Meanwhile, the position of each of the detectable members 4 and 5 on the disc 1 has been determined to provide the pulse signal $P_2$ some degrees (say 10°) before the top dead center in terms of the rotational angle of the crank shaft. The purpose of doing so is to ignite slightly before the top dead center to correct the combustion timing of a fuel in a cylinder of the engine and such ignition is referred to as an advanced ignition. The details of the same will be described subsequently. The pulse signal $P_1$ is provided 90° before the pulse signal $P_2$ in terms of the rotational angle of the crank shaft.

The ignition enabling signal generating means comprises a clock signal generator 6, an OR gate 7, a counter 8, a latch circuit 9, a microcomputer 10, registers 11 and 12 and digital comparators 13 and 14. The output of the clock signal generator 6 is connected to the input of the counter 8 and to the input of the microcomputer 10. The inputs of the OR gate 7 are connected to receive outputs from the position sensors 2 and 3 and the output of the OR gate is connected to the input of the latch circuit 9. The output of the counter 8 is connected to the input of the latch circuit 9 and to the inputs of the comparator 13 and the comparator 14. The output of the latch circuit 9 is connected to the input of the microcomputer 10. The input of the microcomputer is also connected to receive the outputs from the position sensors 2 and 3. The output of the microcomputer 10 is connected to the inputs to the registers 11 and 12. The output of the register 11 is connected to the input of the comparator 13. The output of the register 12 is connected to the input of the comparator 14.

The clock signal generator 6 generates a clock pulse signal of a predetermined frequency. The OR gate 7 evaluates a logical sum of the pulse signals $P_1$ and $P_2$ and provides a logical sum signal. The counter 8 counts the number of clock pulse signals CL obtained from the clock signal generator 6 and provides a count value. The latch circuit 9 is triggered responsive to the logical sum signal obtained from the OR gate 7 to latch the count value of the counter 8 at that time. The count value latched by the latch circuit 9 is provided to the microcomputer 10.

FIG. 2 is a block diagram showing an outline of the microcomputer. The microcomputer 10 comprises a central processing unit 101, a read only memory 102, a random access memory 103 and a data bus DB coupled thereto. The microcomputer 10 receives the pulse signal $P_1$ from the position sensor 2, the pulse signal $P_2$ from the position sensor 3 and the count value from the latch circuit 9 and performs various operations such as an arithmetic operation, storage, outputting of the data and the like in synchronism with the clock pulse signal CL from the clock signal generator 6. The details of the operation of the microcomputer 10 will be described subsequently with reference to FIGS. 3 and 4.

The registers 11 and 12 hold the count value obtained from the microcomputer 10 and the count value is provided to the comparators 13 and 14. The comparator 13 compares the count value obtained from the counter 8 and the count value obtained from the register 11 to provide a pulse signal S upon coincidence of both. Similarly, the comparator 4 compares the count value obtained from the counter 8 and the count value obtained from the register 12 to provide a pulse signal R upon coincidence of both.

The spark plug driving means comprises an R-S flip-flop 15, transistors 16 and 18, a resistor 17, an ignition coil 19, a distributor 20 and a battery 22. The set input terminal of the R-S flip-flop 15 is connected to the ouput of the comparator 13 and the reset input terminal of the same is connected to the output of the comparator 14. The output terminal of the R-S flip-flop 15 is connected to the base of the transistor 16. The emitter of the transistor 16 is connected to the ground. The collector of the transistor 16 is connected to the base of the transistor 18 and one terminal of the resistor 17. The other terminal of the resistor 17 is connected to the positive terminal of the battery 22 and the negative terminal of the battery 22 is connected to ground. The emitter of the transistor 18 is also connected to ground. The collector of the transistor 18 is connected through a primary winding 191 of the ignition coil 19 to the positive terminal of the battery 22. The secondary winding 192 of the ignition coil 19 is connected to a rotational terminal of the distributor 20. The distributor 20 comprises four fixed terminals, each of which is connected to one terminal of each of spark plugs 21a to 21d, respectively. The other terminal of each of the spark plugs 21a to 21d is connected to the ground.

The R-S flip-flop 15 is set by the pulse signal S obtained from the comparator 13 and is reset by the pulse signal R obtained from the comparator 14. The inverted output signal $\bar{Q}$ obtained from the R-S flip-flop 15 assumes the low level when the same is set and assumes the high level when the same is reset. When the output signal $\bar{Q}$ of the R-S flip-flop 15 assumes the low level, the transistor 16 is brought to an off-state, whereby the transistor 18 is brought to an on-state, with the result that a current I is caused to flow through the primary winding 191 of the ignition coil 19. Conversely, when the output signal $\bar{Q}$ of the R-S flip-flop 15 assumes the high level, the transistor 16 is brought to an on-state, whereby the transistor 18 is brought to an off-state, with the result that the current flowing through the primary winding 191 of the ignition coil 19 is interrupted and as a result a high voltage is generated across the secondary winding 192 of the ignition coil 19. The rotational terminal of the distributor 20 is rotated in synchronism with the rotation of the engine at a half of the rotational speed of the engine. As the rotational terminals are rotated, the high voltage generated across the secondary winding of the ignition coil 19 is distributed to the spark plugs 21a to 21d, whereby sparks are generated at the spark plugs 21a to 21d. As the engine is rotated twice, the high voltage generated across the secondary winding of the ignition coil 19 is distributed one time to each of the spark plugs 21a to 21d.

Now referring to FIGS. 3 and 4B, a description will be made of an operation at the beginning after the engine is started until the rotational speed thereof reaches a predetermined value called an idling rotational speed (say 600 rpm). During the start period of the engine, since the fluctuation of the rotational speed of the engine is large, predictive evaluation for evaluating the ignition timing of the next time point based on the rotational speed at a given time point of the engine is not carried out. More specifically, at substantially the same time as the output of the pulse signal P$_1$ conduction of the current I flowing through the primary winding 191 of the ignition coil 19 is started and the current I is interrupted at substantially the same time as the output of the pulse signal P$_2$. FIG. 3 is a graph showing an operation of the ignition control system during the start period of operation of the engine. FIG. 4A is a flow diagram depicting an operation of the microcomputer.

Referring to FIG. 3, P$_1$ and P$_2$ denote the pulse signals obtained from the position sensors 2 and 3, respectively. The count value diagrammatically shows a change of the count value in the counter 8 as a straight line. S denotes the pulse signal obtained from the comparator 13 and R denotes the pulse signal obtained from the comparator 14. $\bar{Q}$ denotes the inverted output signal obtained from the R-S flip-flop 15. I denotes a coil current flowing through the primary winding 191 of the ignition coil 19. When the engine is started, the disc 1 is accordingly rotated and the pulse signals P$_1$ and P$_2$ are obtained from the position sensors 2 and 3, respectively. The pulse signals P$_1$ and P$_2$ are applied through the OR gate 7 to the latch circuit 9 and the count value in the counter 8 at that time is latched by the latch circuit 9. On the other hand, the pulse signals P$_1$ and P$_2$ are also applied to the microcomputer 10 and the microcomputer 10 is responsive to these inputs to read out the count value held in the latch circuit 9 and to detect the input timing of the pulse signals P$_1$ and P$_2$ in terms of the count values. For example, the count values at the input timings of the pulse signals P$_{11}$ and P$_{12}$ are count values C$_{P11}$ and C$_{P12}$, respectively, and the count values at the input timings of the pulse signals P$_{21}$ and P$_{22}$ are the count values C$_{P21}$ and C$_{P22}$, respectively.

Now a description will be made of a case where the coil current I starts to flow through the ignition coil 19. Referring to FIG. 4A, at the step S1 the time period T$_{11}$ between the pulse signals P$_{11}$ and P$_{12}$ is evaluated based on the count values C$_{P11}$ and C$_{P12}$ at the input timing of the pulse signal P$_{12}$. At the step S2, the rotational speed N of the engine at the input timing of the pulse signal P$_{12}$ is evaluated based on the above described time period T$_{11}$ in accordance with the following equation:

$$N = \frac{1}{T_{11}} \times K \qquad (1)$$

where K is a constant.

At the step S3 the rotational speed is compared with the above described idling rotational speed of 600 rpm. Since it is during the start period in this case, the program proceeds to the step S4. At the step S4, a predetermined small count value C$_K$ is added to the count value C$_{P12}$ at the output of the pulse signal C$_{P12}$. The count value C$_K$ corresponds to the time required for operation of the microcomputer 10, the register 11 and the comparator 13.

At the step S5, the above described count value C$_{S1}$ is transferred to the register 11. Returning to FIG. 3, the count value C$_{S1}$ thus determined as described in the foregoing is shown in the figure. The count value C$_{P12}$ assumed in the counter 8 at the input timing of the pulse signal P$_{12}$ becomes the count value C$_{S1}$ immediately. Accordingly, coincidence of the count value obtained from the counter 8 and the count value obtained from the register 11 is detected by means of the comparator 13 and as a result the pulse signal S is obtained from the comparator 13. The output signal $\bar{Q}$ of the R-S flip-flop 15 changes to the low level responsive to the output of the pulse signal S and as a result a flow of the coil current I through the ignition coil 19 is started. As described above, the current I starts to flow through the ignition coil 19 at substantially the same time as the output of the pulse signal P$_1$.

Now a description will be made of a case where the coil current I flowing through the ignition coil is to be interrupted, i.e. the case where the spark plug is to spark. The same processing as shown in conjunction with FIG. 4A is carried out when the engine further rotates to provide the pulse signal $P_{22}$. A count value $C_{R1}$, obtained similarly to the above described count value $C_{S1}$, is transferred to the register 12. Referring to FIG. 3, the count value $C_{P22}$ assumed by the counter 8 at the input timing of the pulse signal $P_{22}$ becomes the count value $C_{R1}$ immediately. Accordingly, coincidence of the count value obtained from the counter 8 and the count value obtained from the register 12 is detected by means of the comparator 14 and the pulse signal R is obtained from the comparator 14. The output signal $\overline{Q}$ of the R-S flip-flop 15 changes to the high level as described above responsive to the output of the pulse signal R and the coil current I of the ignition coil 19 is interrupted, whereby the spark plug generates a spark. As described above, the spark plug is ignited at substantially the same time as the output of the pulse signal $P_2$.

Meanwhile, the above described count value $C_K$ for correction of delay of the operation time is not substantial and therefore the same is neglected in the following description for simplicity. It is pointed out that no inconvenience is caused in the following description by such neglection.

Now referring to FIGS. 4 to 6, a description will be made of an operation in the case where the engine is in an intermediate speed rotation (say 1500 rpm) after the start of the engine is completed, by focusing on the difference from the operation at the start as described previously. The predictive evaluation of the ignition timing is performed after the start of the engine. FIG. 4B is a flow diagram depicting an operation for a predictive arithmetic operation of a conduction start timing of the ignition coil current by means of the microcomputer. FIG. 5 is a table showing the data of the advanced angle stored in the read only memory. FIG. 6 is a graph showing an operation of the ignition control system while the engine is operating at an intermediate speed of rotation.

Now a description will be made of a case where the coil current I begins to flow through the ignition coil 19. Referring to FIG. 4A, as described previously, at the step S1 the time period $T_{22}$ between the pulse signals $P_{24}$ and $P_{25}$ is evaluated based on the count values $C_{P24}$ and $C_{P25}$ at the input timing of the pulse signal $P_{25}$. At the step S2, the rotational speed N of the engine at the input timing of the pulse signal $P_{25}$ is evaluated based on the above described time period $T_{22}$ in accordance with the following equation:

$$N = \frac{1}{T_{22}} \times K \quad (2)$$

where K is a constant.

At the step S3, the rotational speed N is compared with the idling rotational speed 600 rpm. Since the situation is after the start of the engine, the program proceeds to the step S6 in the FIG. 4B.

At the step S6, the advanced angle $\theta$ corresponding to the rotational speed of the engine at that time is obtained by indexing the table of the advanced angle data stored in the read only memory 102 (see FIG. 5). The advanced angle $\theta$ shown in FIG. 5 shows an advanced angle from the output timing of the pulse signal $P_2$ and the relation with the advanced angle from the top dead center in the embodiment shown is expressed as follows:

$$\alpha = \theta + 10 \quad (3)$$

It is well known that generally described the more the rotational speed of the engine is increased the larger the advanced angle should be. Since the rotational speed of the engine is 1500 rpm in the above described case, the advanced angle $\theta$ thus obtained is 10°. At the step S7 the above described advanced angle $\theta$ is converted into a time period $T_\theta$ corresponding to the rotational speed at that time. At the step S8, the conduction start timing point of the coil current I is evaluated as the lapse period $t_{S2}$ from the output timing point of the pulse signal $P_{25}$ in accordance with the following equation:

$$t_{S2} = \frac{T_{22}}{2} - T_\theta \quad (4)$$

At the step S9, the count value $C_{S2}$ at the timing point after the lapse of a time period $t_{S2}$ from the output timing point of the pulse signal $P_{25}$ is evaluated in accordance with the following equation:

$$C_{S2} = C_{P25} + [t_{S2}] \quad (5)$$

where $[t_{S2}]$ is a count value corresponding to the time period $t_{S2}$.

At the step S10, the above described count value $C_{S2}$ is transferred to the register 11. Returning to FIG. 6, the time period $t_{S2}$ and the count value $C_{S2}$ thus determined as described in the foregoing are shown in the figure. The count value $C_{P25}$ assumed in the counter 8 at the input timing of the pulse signal $P_{25}$ becomes the count value $C_{S2}$ after the lapse of a given time period. Accordingly, coincidence of the count value obtained from the counter 8 and the count value obtained from the register 11 is detected by means of the comparator 13 and as a result the pulse signal S is obtained from the comparator 13. The output signal $\overline{Q}$ of the R-S flip-flop 15 changes to the low level responsive to the output of the pulse signal S and as a result a flow of the coil current I through the ignition coil 19 is started.

Now a description will be made of a case where the coil current I flowing through the ignition coil is to be interrupted, i.e. the case where the spark plug is to spark. The same processing as shown in conjunction with FIG. 4A and FIG. 4B at the input timing of the pulse signal $P_{15}$ is carried out. More specifically, the time period $T_{12}$ between the pulse signals $P_{14}$ and $P_{15}$ is evaluated based on the count values $C_{P14}$ and $C_{P15}$ and the rotational speed N of the engine is evaluated based on the time period $T_{11}$. The advanced angle $\theta$ is obtained by indexing the table based on the rotational speed N and the advanced angle $\theta$ is then converted into the time period $T_\theta$. The time period $t_{R2}$ is then evaluated based on the time period $T_\theta$ in accordance with the following equation:

$$t_{R2} = \frac{T_{12}}{2} - T_\theta \quad (6)$$

The count value $C_{R2}$ at the timing after the lapse of time by the time period $t_{R2}$ from the output timing of the pulse signal $P_{15}$ is evaluated in accordance with the following equation:

$$C_{R2} = C_{P15} + [t_{R2}] \quad (7)$$

where $[t_{R2}]$ is a count value corresponding to the time period $t_{R2}$.

The above described count value $C_{R2}$ is transferred to the register 12. The time period $t_{R2}$ and the count value $C_{R2}$ determined in the above described manner are shown in FIG. 6. The count value $C_{P15}$ assumed by the counter 8 at the input timing of the pulse signal $P_{15}$ becomes the count value $C_{R2}$ after the lapse of a given time period. Accordingly, coincidence of the count value obtained from the counter 8 and the count value obtained from the register 12 is detected by means of the comparator 14 and the pulse signal R is obtained from the comparator 14. The output signal $\bar{Q}$ of the R-S flip-flop 15 attains the high level as described above responsive to the output of the pulse signal R and the coil current I of the ignition coil 19 is interrupted, whereby the spark plug sparks. In such case, unless there is an abrupt change of the rotational speed of the engine, since it is predicted that the pulse signal $P_{26}$ is obtained at the timing point after the lapse of the time period $T_{22}$ from the output timing point of the pulse signal $P_{25}$, the spark plug sparks at the timing point advanced by $\theta$ in terms of the advanced angle and by $T_\theta$ in terms of the time period with respect to the output of the pulse signal $P_{26}$.

As seen from the foregoing description, according to the FIG. 1 ignition control system, predictive arithmetic operation has been made of the conduction start timing and the interruption timing of the subsequent coil current based on the data immediately before the signal is applied, at the input timing of the pulse signals $P_1$ and $P_2$ on the presumption that there is no abrupt change of the rotational speed of the engine. Accordingly, if and when there is an abrupt change of the rotation number of the engine, it follows that the ignition timing largely deviates from the normal ignition timing and as a result abnormally advanced ignition or abnormally delayed ignition occurs. Such abrupt change of the rotational speed of the engine would be caused by acceleration with the slots fully opened on the occasion of no load, an abrupt disconnection of the load and the like. This will be further described with reference to FIG. 7. FIG. 7 is a graph depicting an operation of the ignition control system in the case where the rotational speed of the engine is abruptly changed on the occasion of intermediate speed rotation of the engine.

As described previously, the time period $t_{S2}$ determining the conduction start timing of the next coil current I is evaluated based on the time period $T_{22}$ and the time period $T_{R2}$ determining the interruption timing point of the next coil current I is evaluated based on the time period $T_{12}$. In the case where there is no abrupt change of the rotational speed of the engine, the pulse signal $P_{16}$ and $P_{26}$ are obtained at the next timing points and, as described previously, normal advanced ignition is performed. However, assuming that the rotational speed of the engine is abruptly increased, the pulse signals $P_{16}'$ and $P_{26}'$ are obtained in place of and before the pulse signals $P_{16}$ and $P_{26}$. However, since the interruption timing point obtained as a result of predictive evaluation remains as original, the coil current I is interrupted at the timing point as delayed by the time period $T_\theta'$, with respect to the output timing of the pulse signal $P_{26}'$, with the result that an abnormally retarded ignition occurs. Conversely, if and when the rotational speed of the engine is abruptly decreased, the pulse signals $P_{16}''$ and $P_{26}''$ are obtained in place of and after the pulse signals $P_{16}$ and $P_{26}$. Therefore, the coil current I is interrupted at the timing advanced by the time period $T_\theta''$ with respect to the output timing point of the pulse signal $P_{26}''$ and abnormally advanced angle ignition occurs.

When such abnormally advanced ignition or abnormally delayed ignition occurs, an abnormal state such as reverse rotation, knocking, or other bad conditions of the engine, is caused by ignition at abnormal timing or the like of the engine and occasionally the engine could be damaged or destroyed. Apart from the above described case where abnormality is caused by an abrupt change of the rotational speed of the engine, such abnormal ignition (i.e. ignition at abnormal timing) as described above could be caused even in the case where control of the ignition timing is disabled by a temporary abnormality of a microcomputer (such as lost control or runaway in the software) that could happen by chance due to external noise and the like, an instantaneous interruption of the source voltage that could happen due to loose contact of the battery terminals, and the like.

For the purpose of preventing abnormal ignition due to abrupt change of the rotational speed of the engine, an approach could be thought of wherein a trend of the change of the rotational speed of the engine is predicted based on several intervals of the pulse signals $P_1$ or $P_2$, thereby to make predicted arithmetic operation of the following ignition timing, rather than making predicted arithmetic operation of the next ignition timing based on one interval of the pulse signal $P_1$ or $P_2$, as described previously. However according to such approach, the storage capacity of the microcomputer, the number of steps of arithmetic operations and the like are increased and as a result a microcomputer of intermediate speed and large capacity is required, resulting in lessened economy. Furthermore, only the input data of a limited number can be obtained at the beginning of an abrupt accelerating state and the like and therefore, in such transient time period, it is extremely difficult to prevent abnormal ignition. Furthermore, according to such approach, abnormal ignition due to general abnormalities of a microcomputer and the like can not be prevented.

Thus, it has been desired that an ignition control system is provided that is capable of preventing abnormal ignition with certainty without increasing the storage capacity and the number of steps of arithmetic operations of a microcomputer.

SUMMARY OF THE INVENTION

In summary, the present invention comprises an ignition control system of an internal combustion engine, comprising: a spark plug, a spark plug driving means responsive to an externally supplied ignition enabling signal to drive electrically spark plug to cause ignition, a rotational angle position signal generating means for determining the position of the piston in terms of the rotational angle position of the crank shaft for generating a rotational angle position signal, an ignition enabling signal generating means responsive to the rotational angle position signal for generating the above described ignition enabling signal at an ignition timing associated with the rotational speed of the internal combustion engine, and an ignition enabling means for determining an allowable ignition timing range for the internal combustion engine in terms of the rotational angle range of the crank shaft for enabling the above described ignition enabling signal to be applied to the spark plug driving means only during the above described rotational angle range.

According to the present invention, predictive evaluation is made by the ignition enabling signal generating means of the succeeding ignition timing based on the interval of the rotational angle position signals obtained from the rotational angle position signal generating means and an ignition enabling signal is generated at the ignition timing associated with the rotational speed of the interval combustion engine. The ignition enabling means enables the ignition enabling signal to be applied to the spark plug driving means only during the ignition timing range allowable for the engine. The spark plug driving means is responsive to the above described ignition enabling signal to cause ignition by the spark plug. If and when the above described ignition enabling signal is generated outside the allowable ignition timing range for the engine, such as in the case where deviation occurs in the predictive evaluation due to an abrupt change of the rotational speed of the engine, in the case of a temporary abnormality of a microcomputer, or the like, the ignition enabling signal is prevented from being applied to the spark plug driving means by means of the ignition enabling means. Accordingly, in such a case an abnormally advanced ignition angle or an abnormally delayed ignition angle is prevented from occurring. Thus, according to the present invention, it was confirmed that abnormal ignition can be prevented from occurring by the use of a simple means.

Accordingly, a principal object of the present invention is to provide an ignition control system of an internal combustion engine capable of preventing with certainty occurrence of abnormal ignition without increasing a storage capacity and the number of steps of processing of a microcomputer for performing predictive evaluation of an ignition timing.

An aspect of the present invention resides in assured prevention of occurrence of abnormally advanced ignition angle or abnormally delayed ignition angle by the use of a simple means.

Another aspect of the present invention resides in assured prevention of abnormal ignition not only in the case where such abnormal ignition is caused by an abrupt change of the rotational speed of the engine but also in the case where a control of the ignition timing becomes disabled due to a temporary abnormality of a microcomputer, which could happen by chance due to external noise and the like or due to instantaneous interruption of a power supply voltage which may occur, due to loose contact of the battery terminal.

A further aspect of the present invention resides in elimination of the necessity of increasing the storage capacity and the number of steps of processing of a microcomputer for use in predictive evaluation of the ignition timing and hence resides in elimination of necessity of intermediate speed and large scale microcomputer, thereby to enhance economy.

Still a further aspect of the present invention resides in prevention of various phenomena incidental to abnormal ignition such as reverse rotation of the engine, knocking, damage of the engine and the like through assured prevention of occurrence of ignition at abnormal timing.

These objects and other objects, features, aspects and advantages of the present invention will become more apparent from the following detailed description of the present invention when taken in conjunction with the accompanying drawings.

DESCRIPTION OF THE PREFERRED EMBODIMENT

Figure 1:
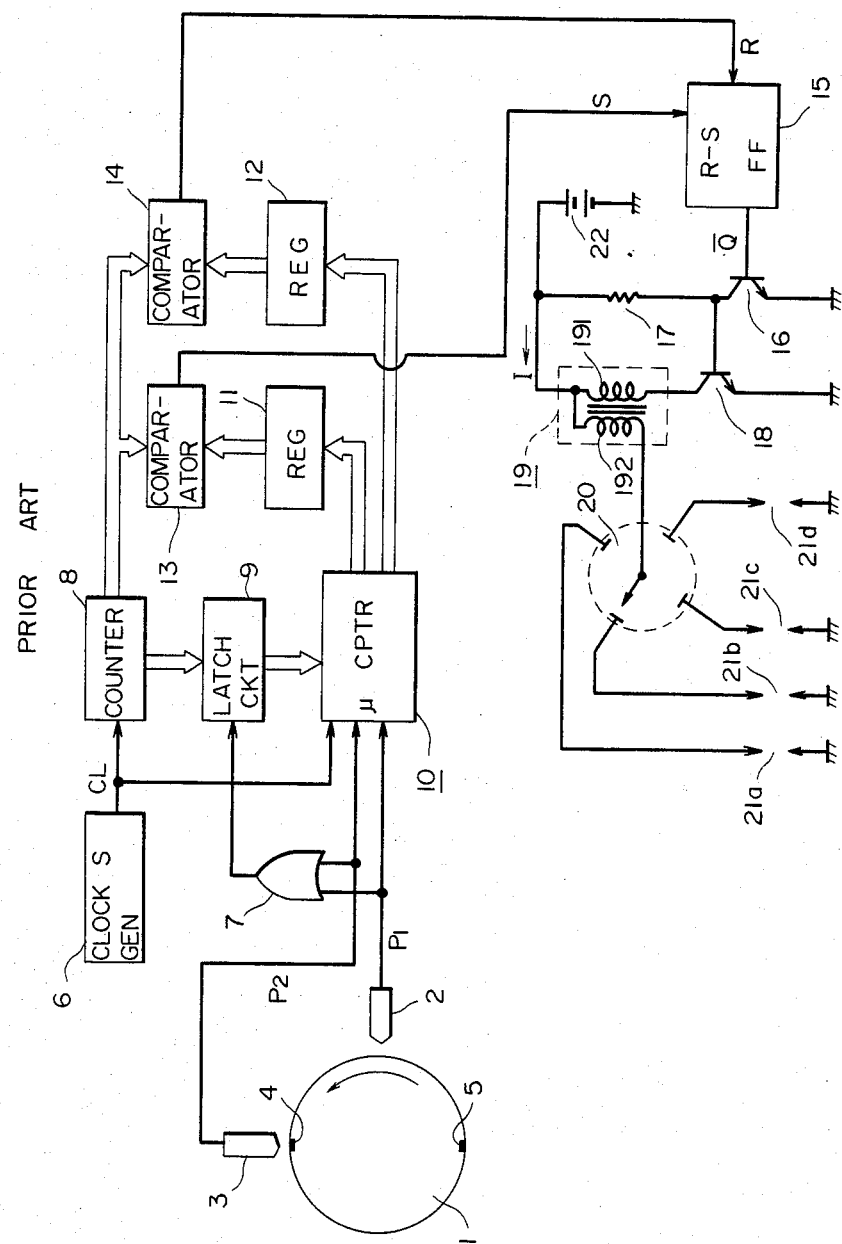
FIG. 1 is a block diagram showing an outline of a conventional ignition control system utilizing a microcomputer.
Figure 8:
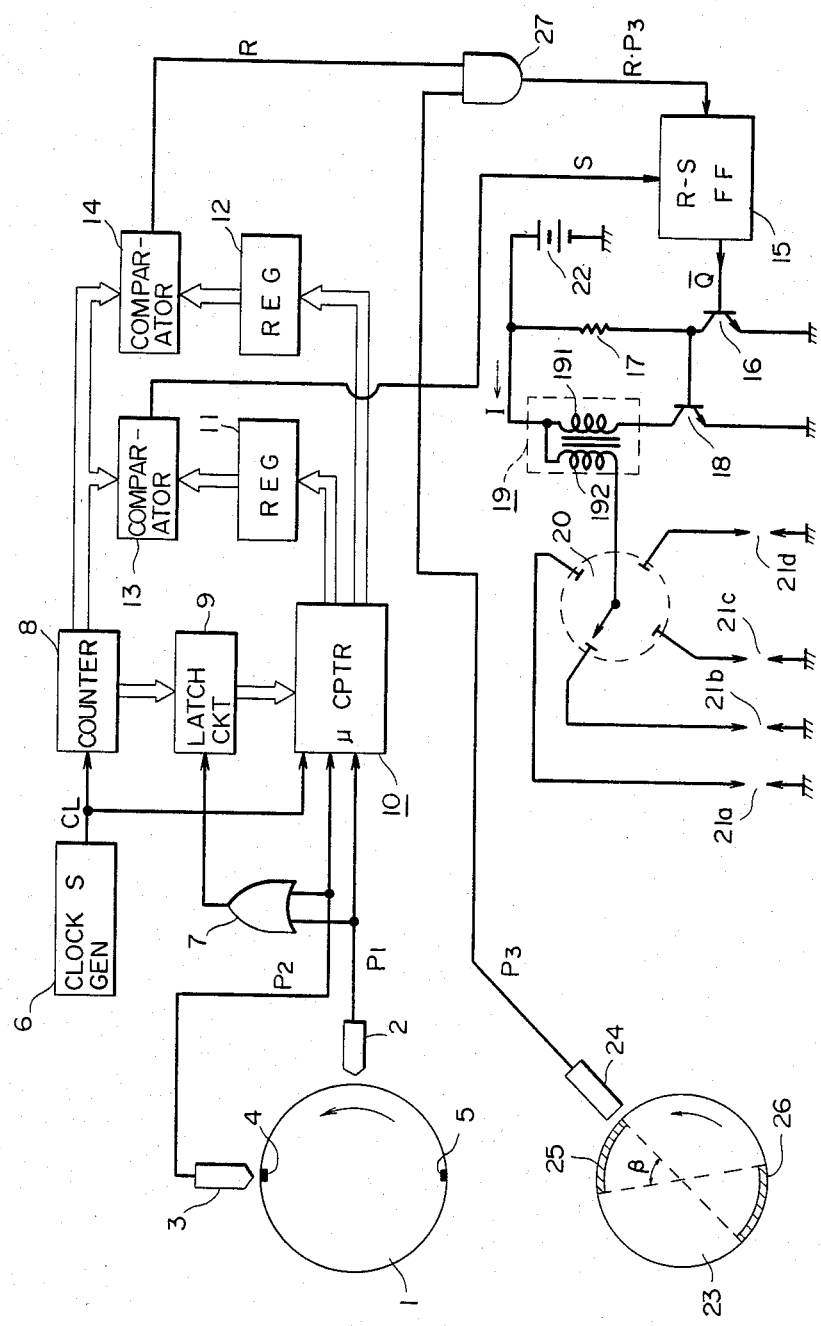
FIG. 8 is a block diagram showing one embodiment of the present invention.

FIG. 8 is a block diagram showing one embodiment of the present invention. In the following a description will be mainly made of the differences of the embodiment from the conventional ignition control system shown in FIG. 1. The embodiment shown comprises an ignition enabling means provided in addition to the FIG. 1 ignition control system. The ignition enabling means comprises a disc 23, a position sensor 24 and an AND gate 27. The disc 23 is coupled to the crank shaft of the engine as in the case of the disc 1. The disc 23 is provided with detectable members 25 and 26 on the outer periphery spaced apart from each other by 180°. The center angles of the detectable members 25 and 26, are each β. The position sensor 24 is provided in the vicinity of the outer periphery of the disc 23. The output of the position sensor 24 is connected to one input of the AND gate 27. The other input of the AND gate 27 is connected to receive the output from the comparator 14. The output of the AND gate 27 is connected to the reset input terminal of the R-S flip-flop 15.

The position sensor 24 is provided to detect the positions of the detactable members 25 and 26 as in the case of the position sensors 2 and 3 and each comprises a proximity switch of an oscillator type having an internally provided oscillator. The detectable members 25 and 26 each comprise a protrusion of metal such as an iron piece in the case where the position sensor 24 is a proximity switch of the oscillator type. The disc 23 is rotated in the arrow direction at the same rotational speed as that of the engine in synchronism with the rotation of the engine. As the result, a rectangular wave signal $P_3$ is obtained from the position sensor 24. In this case, 4 signals $P_3$ are obtained while the disc 23 is rotated twice. Meanwhile, the position and the center angle $\beta$ of the detectable members 25 and 26 on the disc 23 are selected such that the center angle $\beta$ may cover the ignition angle allowable for the engine (for example, from 90° before the top dead center to 10° after the top dead center). By way of an example, in the embodiment shown the center angle $\beta$ is selected to cover the range from 40° before the top dead center to the top dead center. The AND gate 27 evaluates the logical product of the pulse signal R obtained from the comparator 14 and the signal $P_3$ obtained from the position sensor 24, thereby to provide the pulse signal $R.P_3$. The R-S flip-flop 15 is reset responsive to the said pulse signal $R.P_3$.

Figure 3:
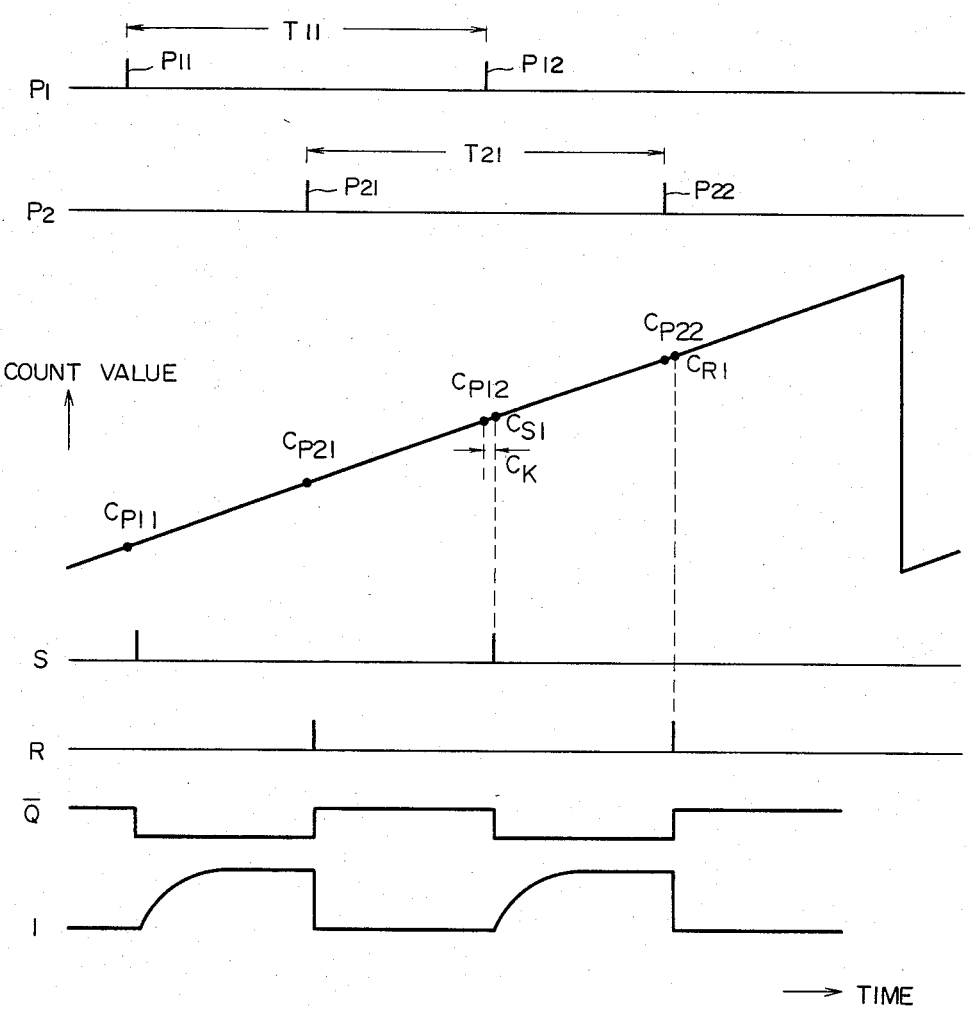
FIG. 3 is a graph showing an operation of a conventional ignition control system during the start period of the engine.
Figure 4A:
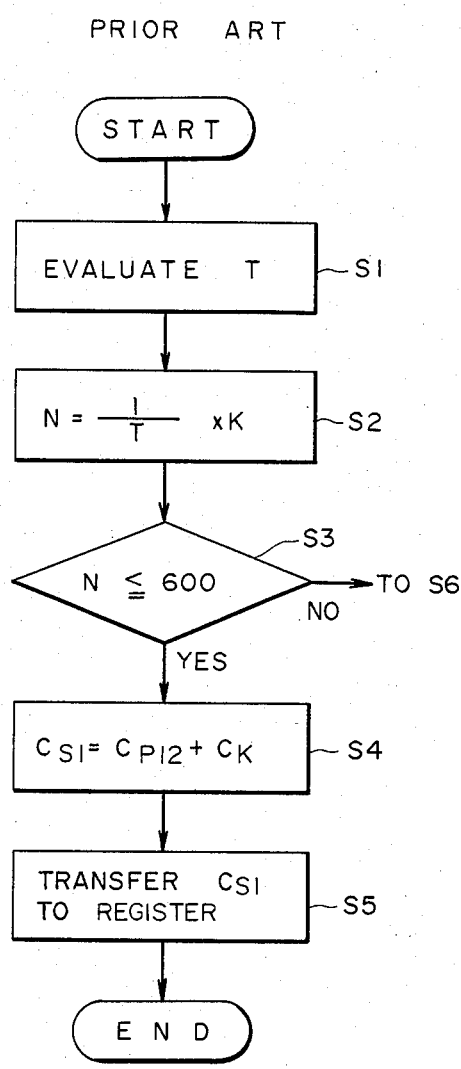
FIG. 4A is a flow diagram depicting an operation of the microcomputer.
Figure 4B:
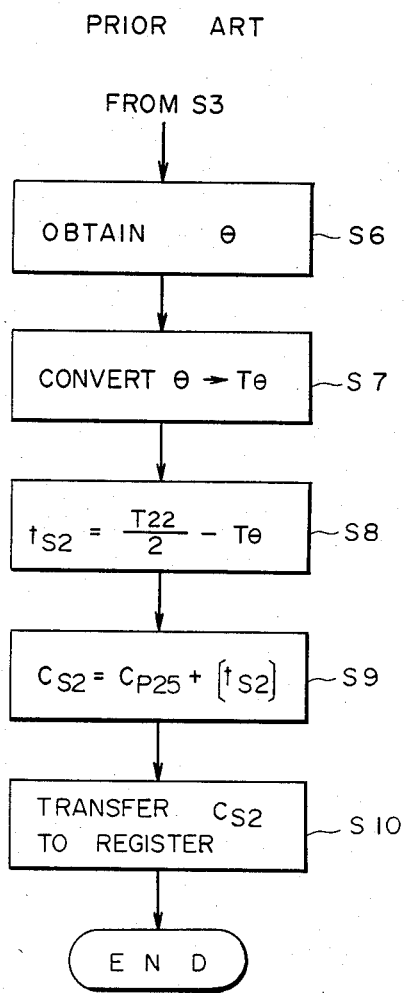
FIG. 4B is a flow diagram of performing predictive evaluation of the conduction start timing of the ignition coil current by the use of a microcomputer.
Figure 6:
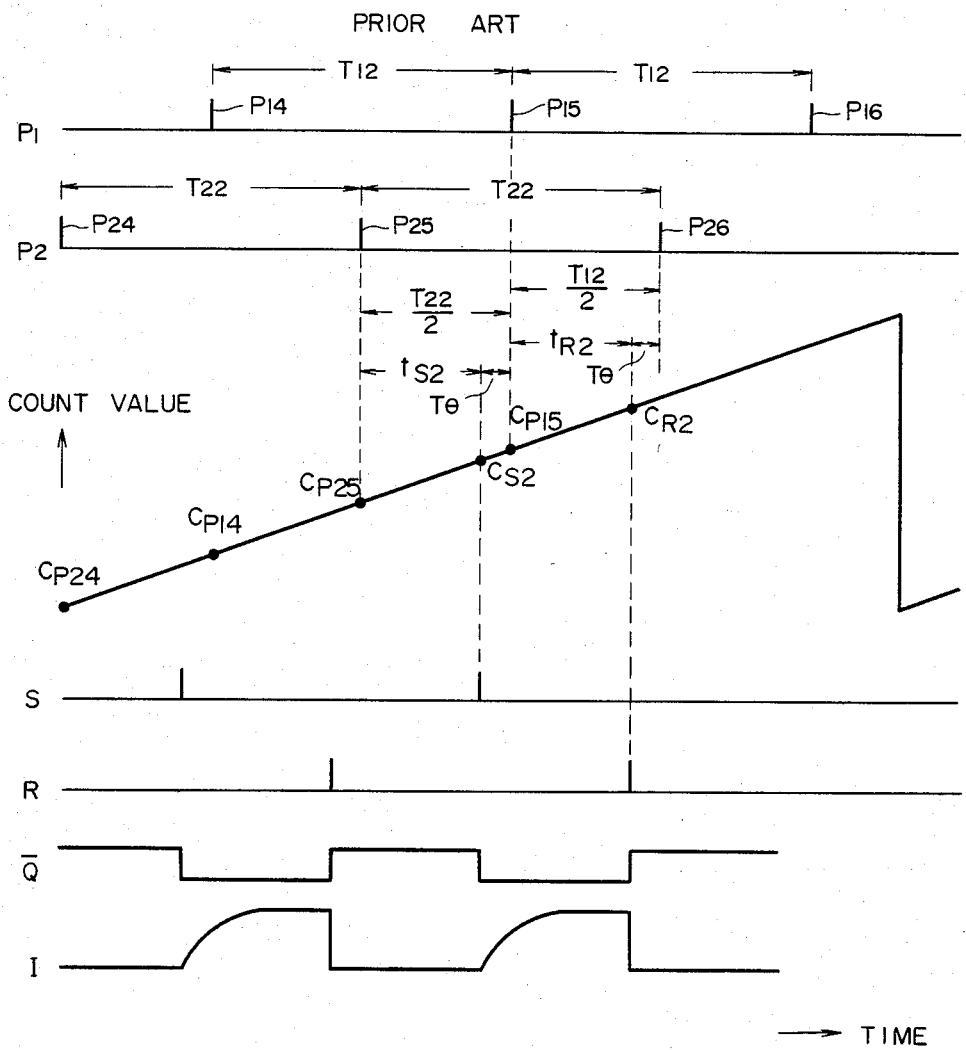
FIG. 6 is a graph showing an operation of the conventional ignition control system while the engine is in intermediate speed rotation.
Figure 9:
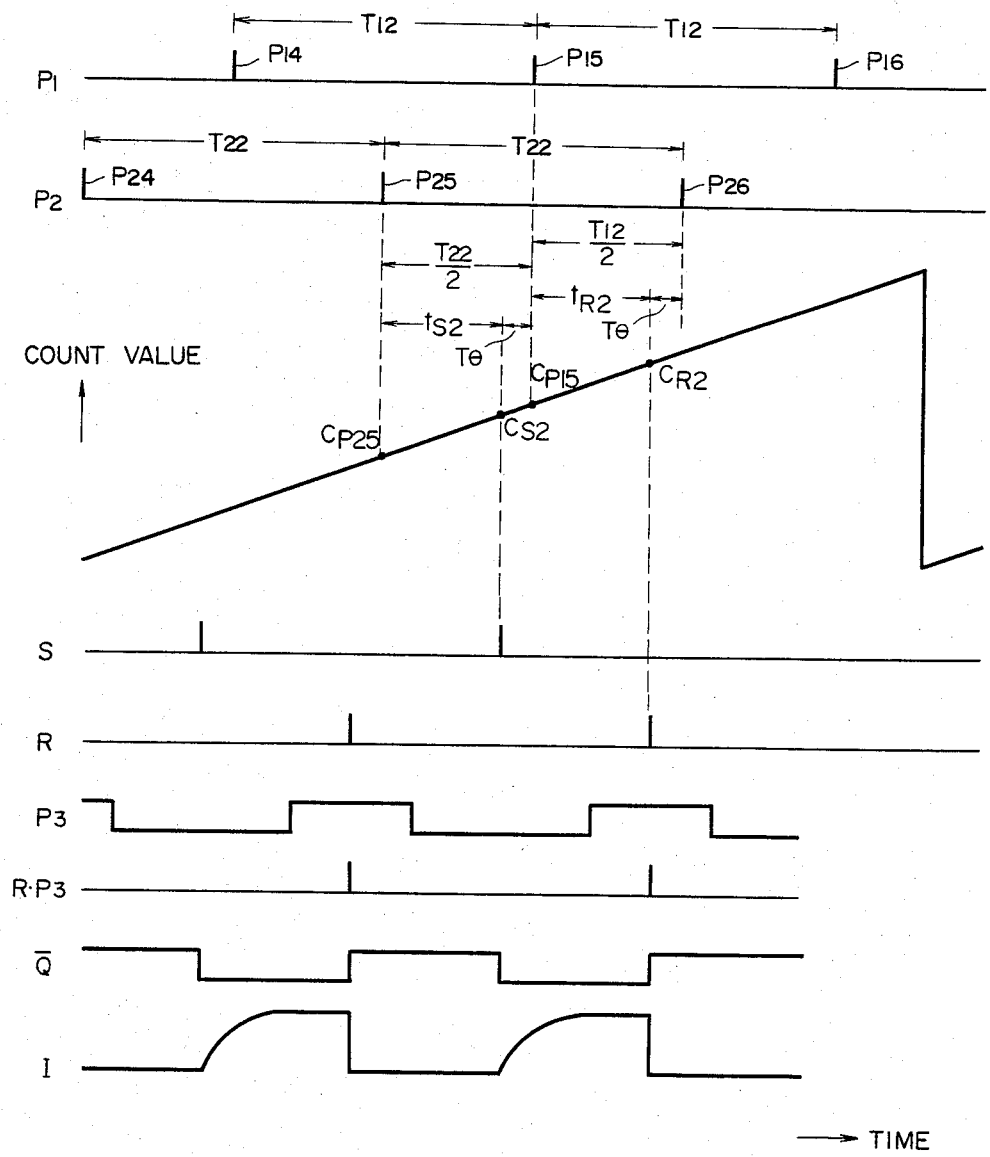
FIG. 9 is a graph showing an operation of the FIG. 8 ignition control system on the occasion of a normal operation while the engine is in intermediate speed rotation.

Now an overall operation of the ignition control system shown in FIG. 8 will be described in the following. First a description will be made of a operation in an normal state in the case where the engine has been in intermediate speed rotation. FIG. 9 is a graph showing an operation of the ignition control system in a normal state in the case where the engine is in intermediate speed rotation. The description will be focused on the differences of the FIG. 9 operation from the FIG. 6 operation. Referring to FIG. 9, $P_3$ denotes a rectangular wave signal obtained from the position sensor 24 and $R.P_3$ denotes the logical product signal obtained from the AND gate 27. Since the center angle $\beta$ has been determined to be the previously described value, the signal $P_3$ assumes the high level during a period from 40° before the top dead center to the top dead center. On the other hand, the pulse signal $P_2$ is obtained at the timing point of 10° before the top dead center, as described previously. Furthermore, the pulse signal R is obtained at the timing point advanced by 10° from the pulse signal $P_2$ (at the timing point of 20° before the top dead center) in the case where the rotational speed of the engine is say 1500 rpm, as described previously. Accordingly, the logical product of the pulse signal R and the signal $P_3$ is obtained by the AND gate 27 and the pulse signal $R.P_3$ is obtained from the AND gate 27. As a result, the R-S flip-flop 15 is reset and the output signal $\overline{Q}$ from the R-S flip-flop 15 becomes a high level and the coil current I of the ignition coil 19 is interrupted, whereby ignition of the spark plug is performed. The above described operation is exactly the same as that of the conventional ignition control system shown in FIG. 3.

Figure 7:
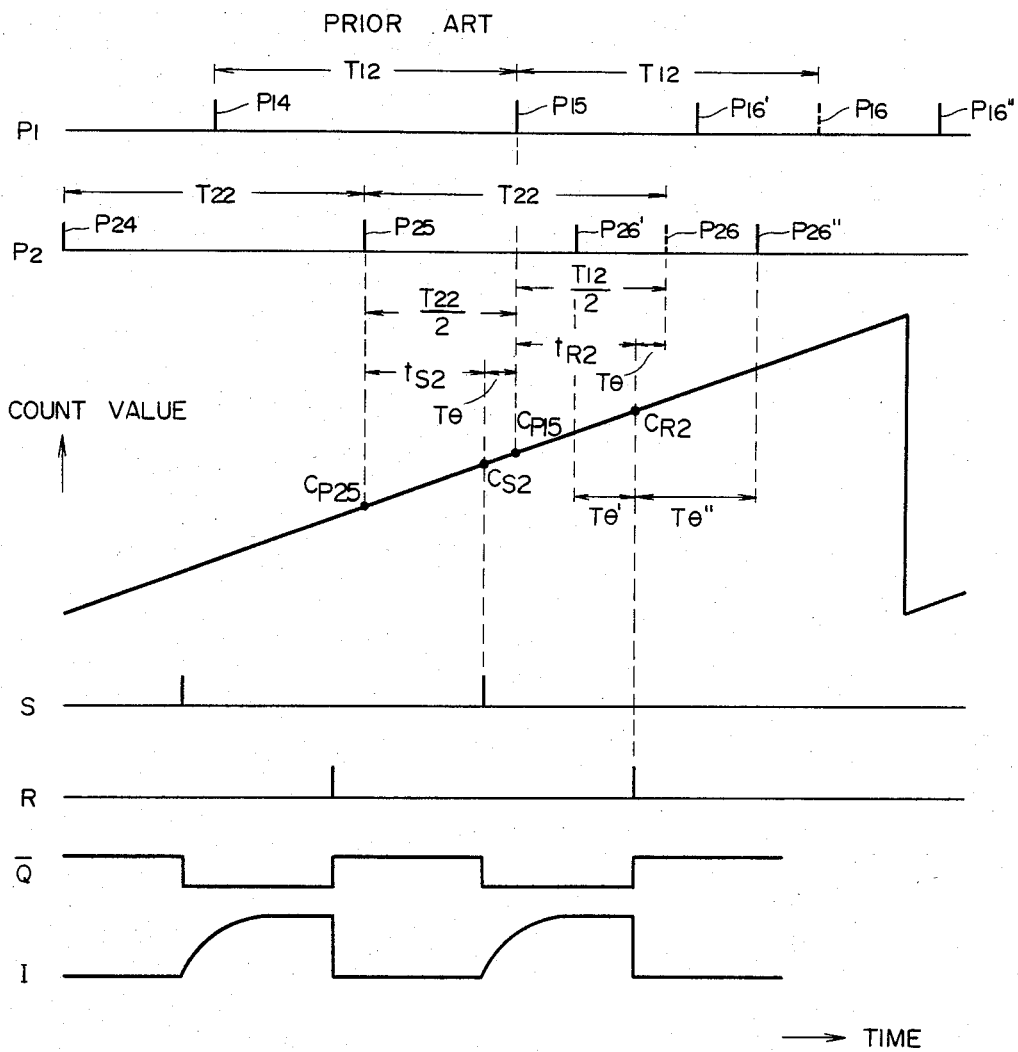
FIG. 7 is a graph showing the operation of the conventional ignition control system in the case where the rotational speed of the engine is abruptly changed while the engine is in intermediate speed rotation.
Figure 10:
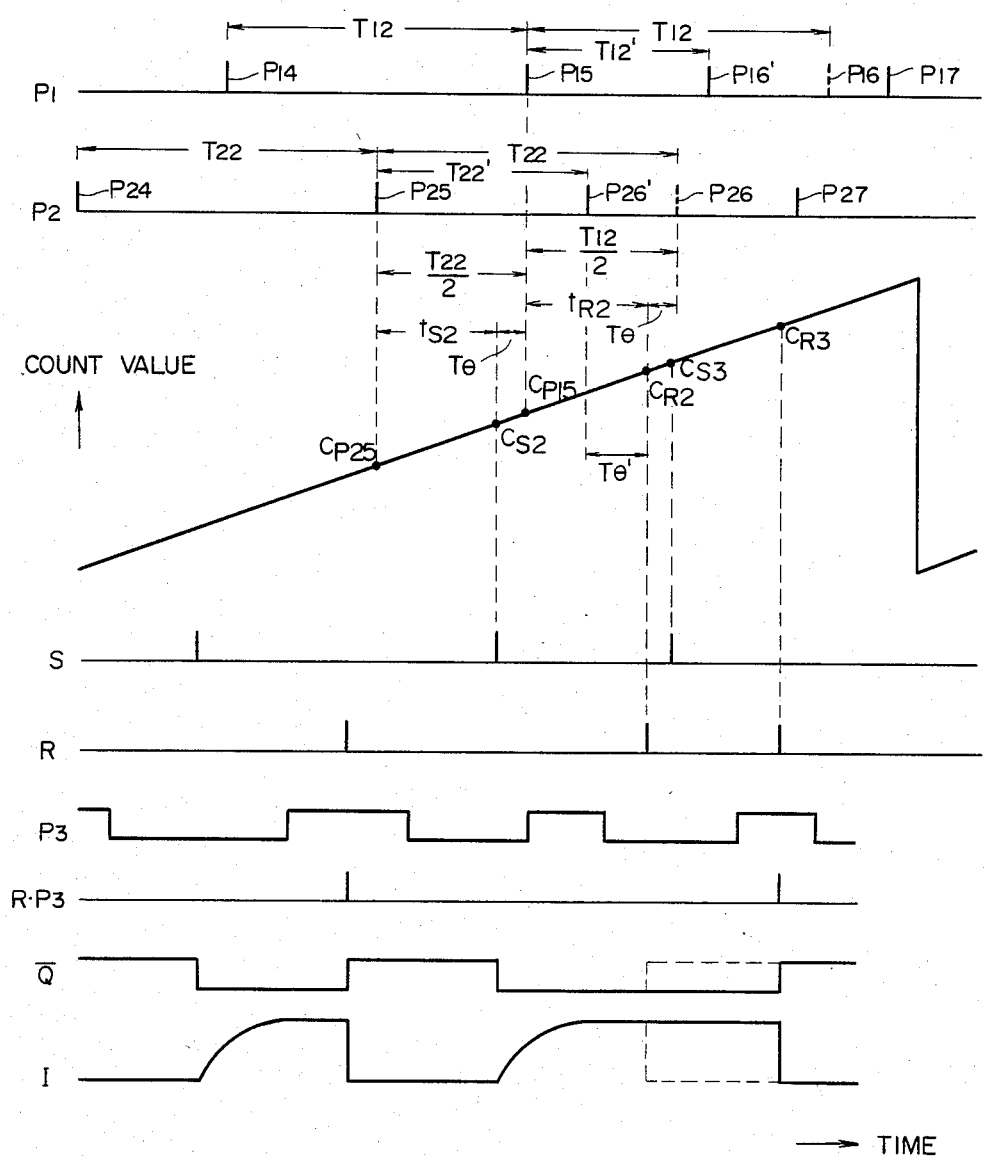
FIG. 10 is a graph showing the operation of the FIG. 8 ignition control system in the case where the rotational speed of the engine is abruptly increased while the engine is in intermediate speed rotation.

Now a description will be made of a case where the rotational speed of the engine is abruptly changed while the engine is in intermediate speed rotation. FIG. 10 is a graph showing an operation of the ignition control system in the case where the rotational speed of the engine is abruptly increased while the engine is in intermediate speed rotation. Now a description will be mainly made of the differences of the FIG. 10 operation from the FIG. 9 operation. As described previously with reference to FIG. 7, if and when the rotational speed of the engine is abruptly increased, the pulse signals $P_{16}'$ and $P_{26}'$ are obtained earlier than the pulse signals $P_{16}$ and $P_{26}$ in place of these. However, since the interruption timing point as evaluated by the predictive evaluation remains the same, the pulse signal R is obtained from the comparator 14 at the timing point delayed by the time period $T_\theta'$ with respect to the output timing point of the pulse signal $P_{26}'$. On the other hand, the timing point when the signal $P_3$ becomes a high level signal is also advanced due to the abrupt increase of the rotational speed of the engine and the time period when the said output is obtained becomes short. Accordingly, at the timing point when the count value is $C_{R2}$ the logical product of the pulse signal R and the signal $P_3$ is not obtained by the AND gate 27 and accordingly, the pulse signal $R.P_3$ is not obtained. As a result, the output signal $\overline{Q}$ from the R-S flip-flop 15 is prevented from assuming the high level at that timing point and accordingly the coil current I is prevented from being interrupted and hence abnormal ignition is prevented (see $\overline{Q}$ and I shown by the dotted line in the figure). Then, as in the same manner as described previously, the count value $C_{S3}$ is evaluated based on the time period $T_{22}'$ between the pulse signals $P_{25}$ and $P_{26}'$ and the count value $C_{R3}$ is evaluated based on the time period $T_{12}'$ between the pulse signal $P_{15}$ and $P_{16}'$. At the timing point when the count value in the counter 8 becomes $C_{S3}$ and $C_{R3}$ after the lapse of a time period, the pulse signal S is obtained from the comparator 13 and the pulse signal R is obtained from the comparator 14, respectively. Even when the pulse signal S is obtained at the timing point when the count value is $C_{S3}$, the R-S flip-flop remains set, which means that it does not matter. When the pulse signal R is obtained at the timing point when the count value is $C_{R3}'$ the signal $P_3$ is at the high level at that timing point, and then the logical product of the pulse signal R and the signal $P_3$ is provided by the AND gate 27, whereby the coil current I is interrupted and ignition of the spark plug is performed.

Although in the foregoing description was made of a case where the rotational speed of the engine is abruptly increased, the same operation is performed even in the case where the rotational speed of the engine is abruptly decreased, where the ignition timing is restricted within the time period when the signal $P_3$ is the high level and abnormal ignition is prevented. Even if the pulse signal R is obtained at an abnormal timing point for some reason other than the reason of abrupt change of the rotational speed of the engine, such as in the case where the clock frequency of the clock signal generator 6 is temporarlly changed due to external noise and the like, in the case of a temporary abnormality of a microcomputer, in the case of instantaneous interruption of a power supply voltage, and the like, the ignition timing is restricted within a time period when the signal $P_3$ is the high level, whereby abnormal ignition is prevented.

According to the ignition conytrol system shown in FIG. 8, abnormal ignition can be prevented; however, as is seen from FIG. 10, a miss fire cycle is included in which ignition of the spark plug is prevented at the timing point when the count value is $C_{R2}$. The fact that the miss fire cycle is included could cause inconveniences such as hesitation of the engine, a poor acceleration response and the like. Therefore, in the following a description will be made of an embodiment which is capable of preventing occurrence of a miss fire cycle even on the occasion of abnormality.

Figure 11:
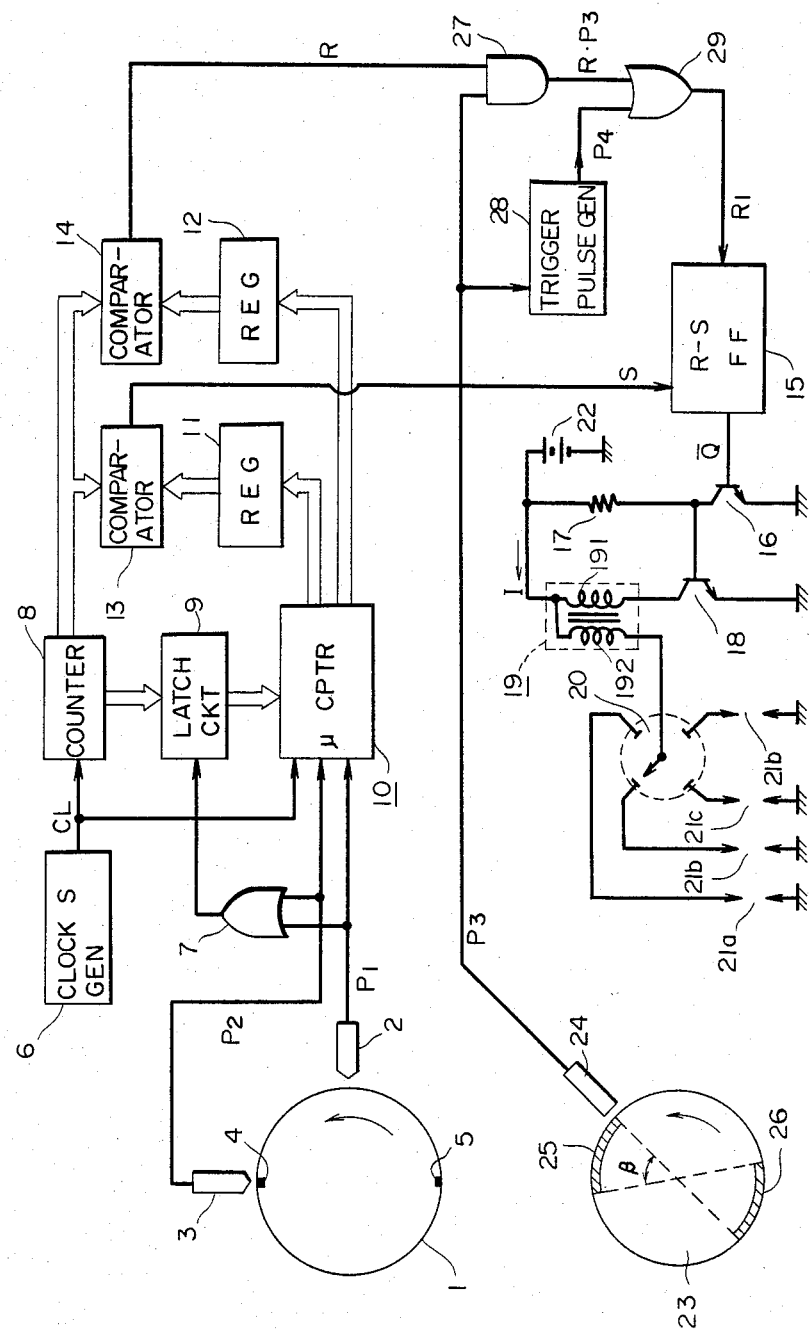
FIG. 11 is a block diagram shown another embodiment of the present invention.

FIG. 11 is a block diagram showing another embodiment of the present invention. In the following a description will be mainly made of the differences of the FIG. 11 embodiment from the FIG. 8 embodiment. The embodiment shown further comprises a trigger pulse generator 28 and an OR gate in addition to the FIG. 8 ignition control system. The input of the trigger pulse generator 28 is connected to the output of the position sensor 24 and the output of the trigger pulse generator 28 is connected to one input of the OR gate 29. The other input of the OR gate 29 is connected to receive the output from the AND gate 27. The output of the OR gate 29 is connected to the reset input terminal of the R-S flip-flop 15.

The trigger pulse generator 28 comprises a differentiating circuit or the like and is responsive to the trailing edge of the signal $P_3$ obtained from the position sensor 24 to generate the pulse signal $P_4$. As described previously, the signal $P_3$ assumes the high level over the ignition angle range allowable for the engine and therefore the pulse signal $P_4$ is generated at the end of the allowable ignition timing range for the engine. The OR gate 29 provides the logical sum of the pulse signal $P_4$ and the pulse signal $R.P_3$ thereby to provide the pulse signal $R_1$. The R-S flip-flop 15 is reset responsive to the pulse signal $R_1$.

Figure 12:
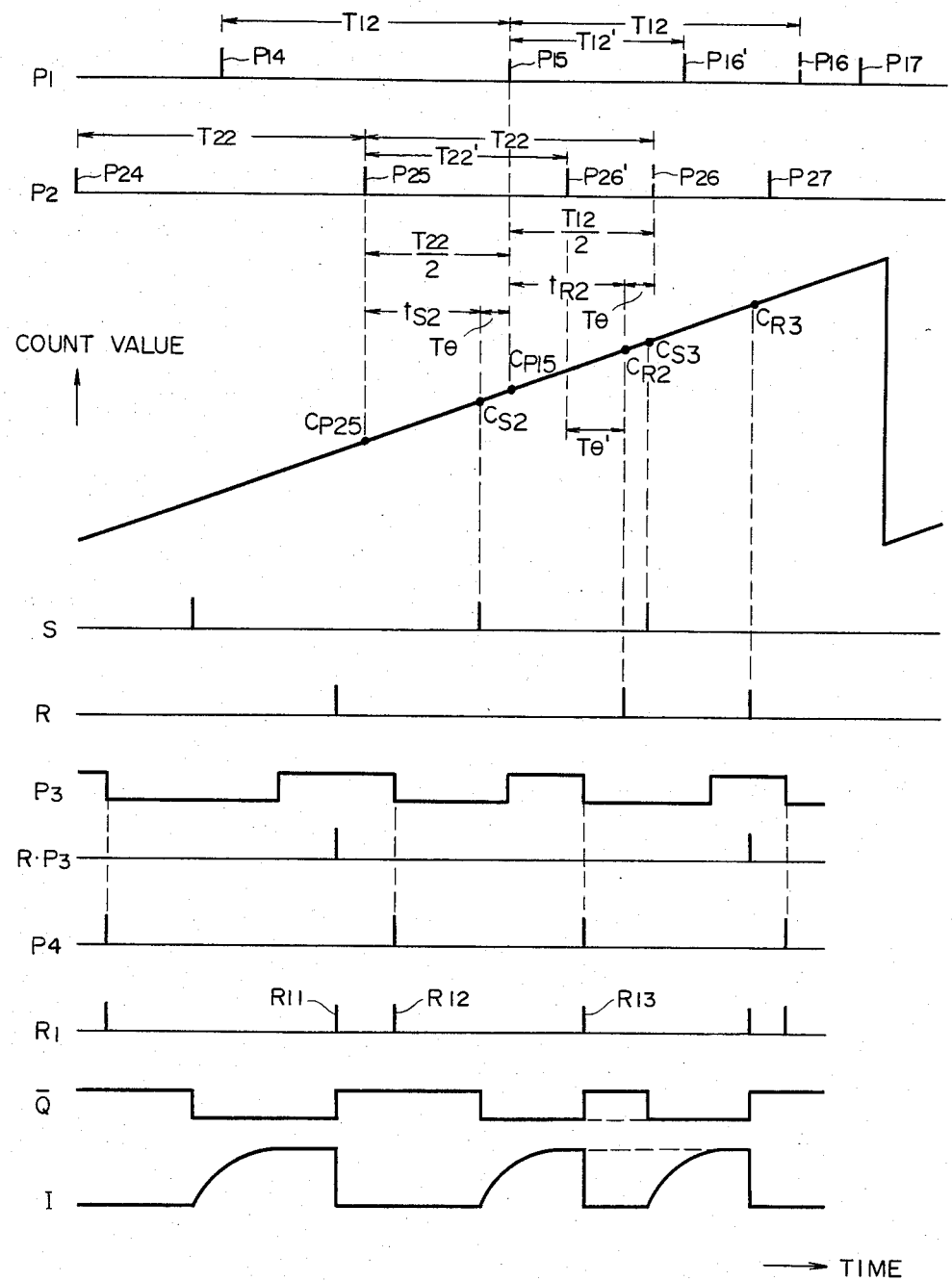
FIG. 12 is a graph showing the operation of the FIG. 11 ignition control system in the case where the rotational speed of the engine is abruptly increased while the engine is in intermediate speed rotation.

Now a description will be made of an overall operation of the ignition control system shown in FIG. 11. FIG. 12 is a graph depicting the operation of the ignition control system in the case where the rotational speed of the engine is abruptly increased while the engine is in intermediate speed rotation. A description will be mainly made of the differences of the FIG. 12 operation from the FIG. 10 operation. Referring to FIG. 12, $P_4$ denotes a trigger pulse signal obtained from the trigger pulse generator 28 and $R_1$ denotes a pulse signal obtained from the OR gate 29. The pulse signal $P_4$ is obtained at the timing point of occurrence of the trailing edge of the signal $P_3$. If and when the timing point when the signal $P_3$ attains the high level is advanced and the time period thereof is shortened due to an abrupt increase of the rotational speed of the engine, the pulse signal $P_4$ is also obtained earlier while the interval thereof becomes shorter. Since the R-S flip-flop is reset responsive to the pulse signal $R_{11}$, the pulse signal $R_{12}$ occurring immediately thereafter has no meaning. At that timing point, the same state as that shown in FIG. 10 is assumed. However, the R-S flip-flop 15 is reset responsive to the pulse signal $R_{13}$, the output signal $\overline{Q}$ becomes high, and the coil current I is interrupted, whereby ignition of the spark plug is performed. As a result, a miss fire cycle is prevented from occurring.

As described in the foregoing, according to the embodiment shown in FIG. 11, not only is an abnormal ignition prevented but also ignition is necessarily performed once within a predetermined ignition angle range, in the case where an abrupt change of the rotational speed of the engine is involved or the like, with the result that a miss fire cycle is prevented from occurring. Accordingly, any inconveniences such as hesitation of the engine, a poor acceleration response and the like are prevented from occurring.

Figure 13:
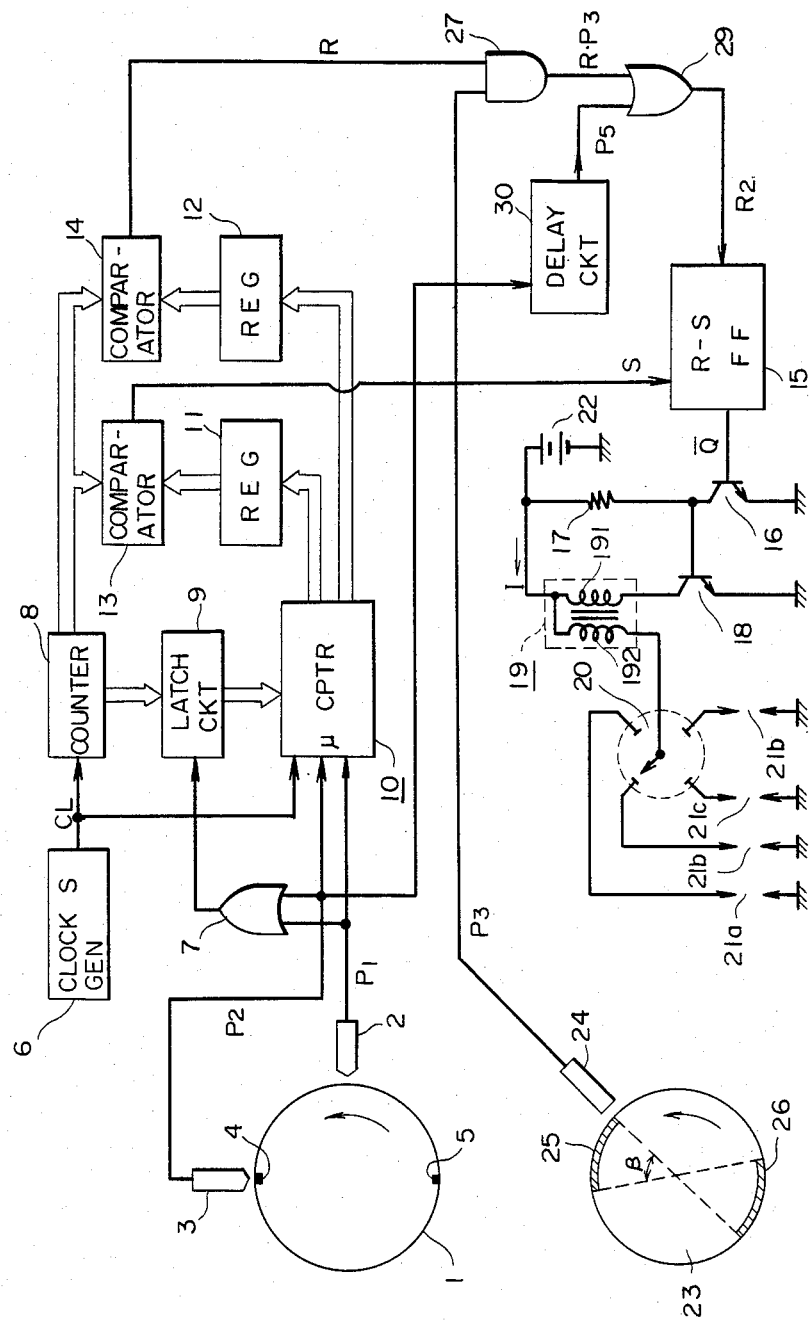
FIG. 13 is a block diagram showing a further embodiment of the present invention.

FIG. 13 is a block diagram showing a further embodiment of the present invention. In the following a description will be mainly made of the differences of the FIG. 13 embodiment from the FIG. 8 embodiment. The FIG. 13 embodiment further comprises a delay circuit 30 and an OR gate 29 in addition to those in the FIG. 8 ignition control system. The input of the delay circuit 30 is connected to the output of the position sensor 3 and the output of the delay circuit 30 is connected to one input of the OR gate 29. The other input of the OR gate 29 is connected to the output of the AND gate 27. The output of the OR gate 29 is connected to the reset input terminal of the R-S flip-flop 15.

The delay circuit 30 provides a pulse signal $P_5$ after a delay of the pulse signal $P_2$ by a predetermined time period, say the time period $t_D$. How to determine the delay time $t_D$ is described subsequently. The OR gate 29 evaluates the logical sum of the pulse signal $P_5$ and the pulse signal $R.P_3$ to provide a pulse signal $R_2$. The R-S flip-flop 15 is reset responsive to the pulse signal $R_2$.

Figures 2, 5:
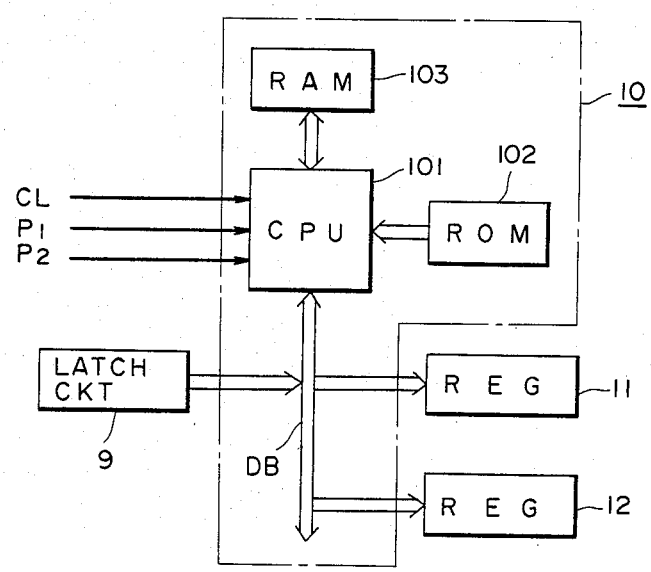
FIG. 2 is a block diagram showing an outline of a microcomputer.
FIG. 5 is a table of the advanced angle data stored in a read only memory.
Figure 14:
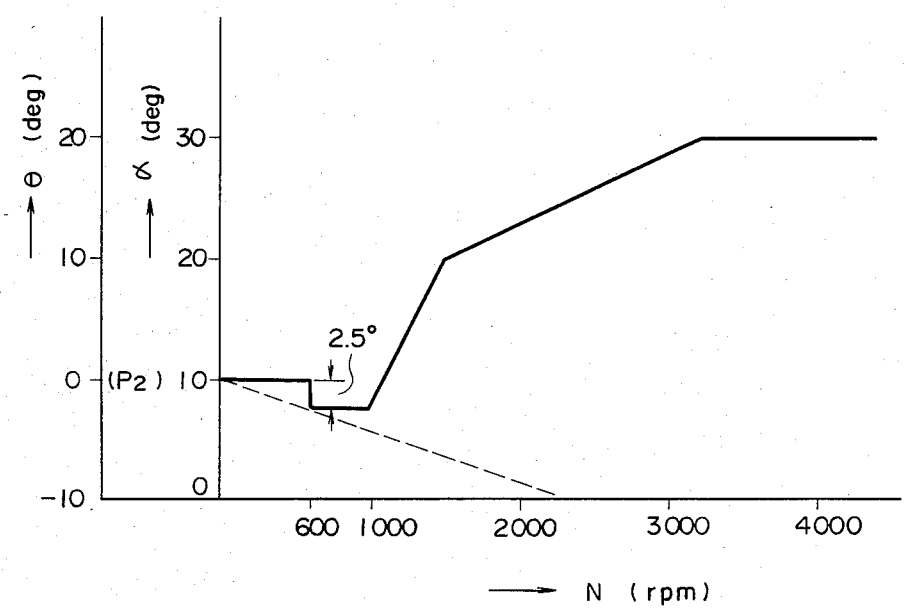
FIG. 14 is a graph showing a relation between the rotational speed and the advanced angle of the engine.

Now a description will be made of how to determine the delay time period $t_D$. FIG. 14 is a graph showing a relation between the rotational speed N of the engine and the advanced angle. The advanced angle $\alpha$ denotes an advanced angle from the top dead center and the advanced angle $\theta$ denotes an advanced angle from the output timing point of the pulse signal $P_2$. Referring to FIG. 14, the solid line denotes an advanced angle stored in the advanced angle data table previously described with reference to FIG. 5 and the dotted line denotes that obtained through conversion of the delay time period $t_D$ to the advanced angle with respect to the rotational speed of the engine.

The delay time period $t_D$ is determined so that the above described pulse signal $P_5$ may be generated at the minimum advanced angle ($\alpha = 7.5°$ or $\theta = -2.5°$) necessary for the engine in the idling rotational speed of the engine (600 rpm). The delay time period $t_D$ in this case is evaluated by the following equation:

$$t_D = \frac{60(\text{sec})}{600(\text{rpm})} \times \frac{2.5(\text{deg})}{360(\text{deg})} \approx 700(\mu \text{ sec}) \qquad (7)$$

As seen from the equation (7), when the delay time period $t_D$ is determined to be a predetermined value as described previously, that obtained through conversion of the same to the advanced angle with respect to the rotational speed of the engine becomes a straight line as shown by the dotted line in FIG. 14.

Figure 15:
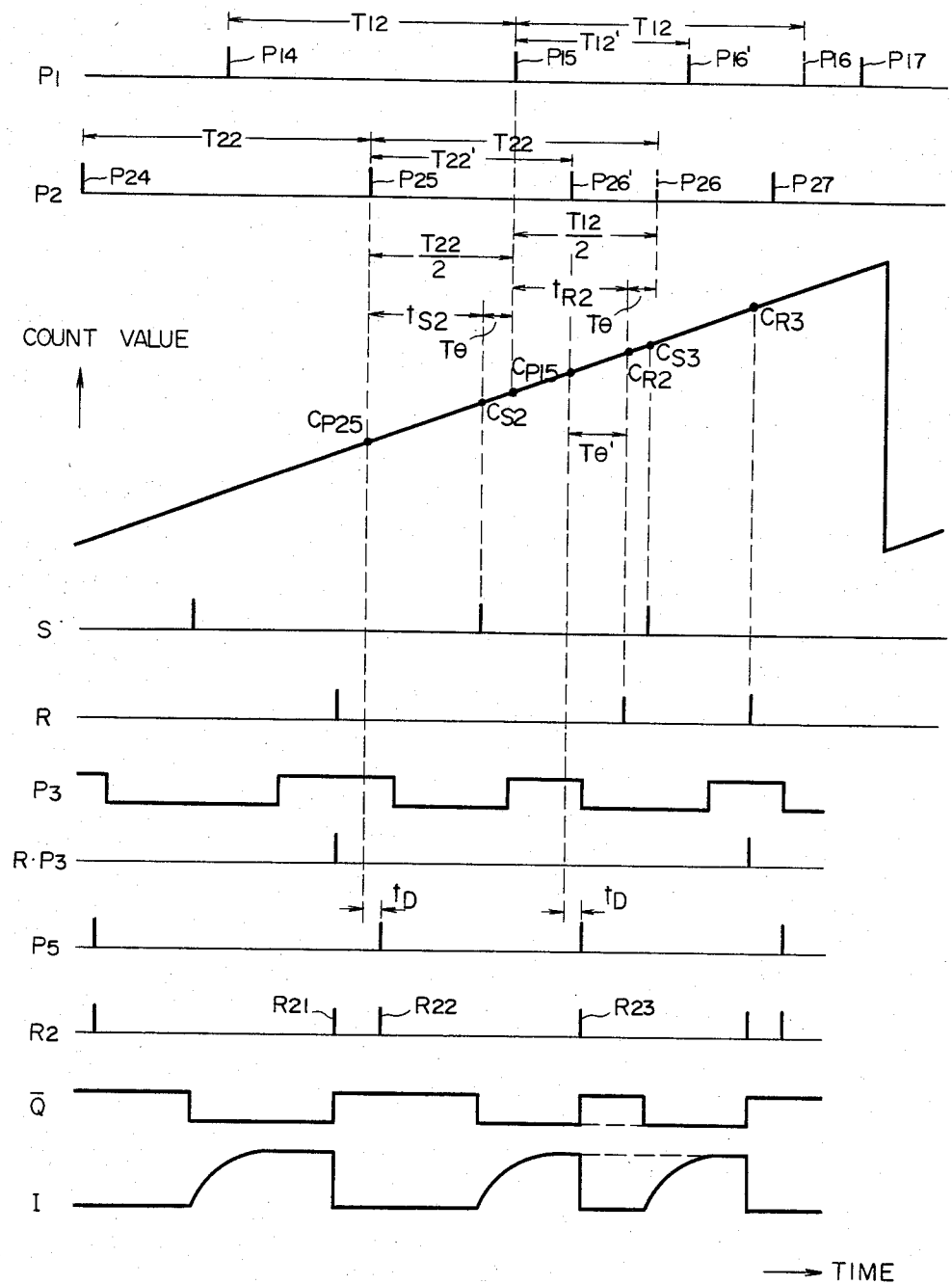
FIG. 15 is a graph showing the operation of the FIG. 13 ignition control system in the case where the rotational speed of the engine is abruptly increased while the engine is in intermediate speed rotation.

Now an overall operation of the ignition control system shown in FIG. 13 will be described. FIG. 15 is a graph depicting an operation of the ignition control system in the case where the rotational speed of the engine is abruptly increased while the engine is in intermediate speed rotation. Now a description will be mainly made of the differences of the FIG. 15 operation from the FIG. 10 operation. Referring to the FIG. 15, $P_5$ denotes a delayed pulse signal obtained from the delay circuit 30, and $R_2$ denotes a pulse signal obtained from the OR gate 29. The pulse signal $P_5$ is obtained at the timing point delayed by the delay time period $t_D$ from the output timing point of the pulse signal $P_2$. If and when the timing point when the pulse signal $P_2$ is obtained is advanced due to an abrupt increase of the rotational speed of the engine, the timing point when the pulse signal $P_5$ is obtained is accordingly advanced. However, the delay time period $t_D$ is unchanged. Since the R-S flip-flop 15 is reset responsive to the pulse signal $R_{21}$, the pulse signal $R_{22}$ generated immediately thereafter has no meaning. At that timing point the same state as that shown in FIG. 10 is assumed. However, the R-S flip-flop 15 is reset responsive to the pulse signal $R_{23}$, the output signal $\overline{Q}$ becomes the high level and the coil current I is interrupted, whereby ignition of the spark plug is performed. As a result, a miss fire cycle is prevented from occurring.

Although the FIG. 13 embodiment was adapted such that the delay circuit 30 is provided and the pulse signal $P_5$ is obtained from the delay circuit 30, alternatively the embodiment may be adapted such that the pulse signal $P_5$ is obtained from the microcomputer 10 without providing the delay circuit 30.

As described in the foregoing, even in the case of the embodiment shown in FIG. 13, not only abnormal ignition is prevented but also a miss fire cycle is prevented from occurring, as in the case of the FIG. 11 embodiment, in the case where the rotational speed of the engine is abruptly changed. Accordingly, any inconveniences of such as hesitation of the engine, a poor accelerating response and the like are prevented from occurring.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An ignition control system of an internal combusion engine comprising:
    a spark plug mounted to a cylinder of an internal combustion engine, said cylinder slidably receiving a piston coupled to a crank shaft,
    spark plug driving means coupled to said spark plug and responsive to an externally applied ignition enabling signal for electrically driving said spark plug for causing ignition
    rotational angle position signal generating means operatively coupled to said crank shaft for generating a rotational angle position signal representing the position of said piston of said internal combustion engine determinable in terms of the rotational angle position of said crank shaft,
    ignition enabling signal generating means coupled to said rotational angle position signal generating means and responsive to said rotational angle position signal for generating said ignition enabling signal at an ignition timing associated with the rotational speed of said internal combustion engine, and
    ignition enabling means for determining an allowable ignition timing range for said internal combustion engine in terms of an allowable rotational angle range of said crank shaft for enabling application of said ignition enabling signal to said spark plug driving means only during said allowable rotational angle range
    said ignition enabling means comprising
    a rotating member coupled to said crank shaft,
    rotational angle range determining means for determining said allowable rotational angle range of said rotating member for generating an allowable rotational angle range signal,
    logical product evaluating means coupled to said ignition enabling signal generating means and to said rotational angle range determining means for evaluating a logical product of said ignition enabling signal and said allowable rotational angle range signal for providing a logical product signal to said spark plug driving means, and
    delay means for preventing occurrences of misfire cycles wherein an ignition enabling signal is not applied to said spark plug driving means, said delay means coupled to said rotational angle position signal generating means for delaying said rotational angle position signal by a predetermined time period for providing a delayed signal, and
    logical sum evaluating means coupled to said delay means and to said logical product evaluating means for evaluating a logical sum of said delay signal and said logical product signal, said logical sum evaluating means connected for providing a logical sum signal to said spark plug driving means thereby generating an alternative ignition enabling signal for application to said spark plug driving means in cycles wherein said ignition enabling signal occurs outside of said allowable ignition timing range and is blocked by said ignition enabling means from application to said spark plug driving means.

2. An ignition control system for an internal combustion engine comprising:
    a spark plug mounted to a cylinder of an internal combustion engine, said cylinder slidably receiving a piston coupled to a crank shaft,
    spark plug driving means coupled to said spark plug and responsive to an externally applied ignition enabling signal for electrically driving said spark plug for causing ignition in said cylinder,
    rotational angle position signal generating means operatively coupled to said crank shaft for generating a rotational angle position signal representing the position of said piston of said internal combustion engine determinable in terms of the rotational angle position of said crank shaft,
    ignition enabling signal generating means coupled to said rotational angle position signal generating means and responsive to said rotational angle position signal for generating said ignition enabling signal at an ignition timing associated with the rotational speed of said internal combustion engine, and
    ignition enabling means for determining an allowable ignition timing range of said internal combustion engine in terms of an allowable rotational angle range of said crank shaft for enabling application of said ignition enabling signal to said spark plug driving means only during said allowable rotational angle range
    said ignition enabling means comprising
    a rotating member coupled to said crank shaft,
    rotational angle range determining means for determining said allowable rotational angle range of said rotating member for generating an allowable rotational angle range signal, and
    logical product evaluating means coupled to said ignition enabling signal generating means and to said rotational angle range determining means for evaluating a logical product of said ignition enabling signal and said allowable rotational angle range signal for providing a logical product signal to said spark plug driving means,
    said logical product evaluating means comprising AND gate means having a first input terminal connected to receive said ignition enabling signal and a second input terminal connected to receive said allowable rotational angle range signal, said AND gate means operable for blocking application of said ignition enabling signal to said spark plug driving means when said ignition enabling signal is generated outside said allowable ignition timing range, and having an output terminal connected for providing said logical product signal to said spark plug driving means for driving said spark plug to cause ignition in said cylinder only during said allowable rotational angle range.

3. An ignition control system of an internal combustion engine comprising:
   a spark plug mounted to a cylinder of an internal combustion engine, said cylinder slidably receiving a piston coupled to a crank shaft,
   spark plug driving means coupled to said spark plug and responsive to an externally applied ignition enabling signal for electrically driving said spark plug for causing ignition in said cylinder,
   rotational angle position signal generating means operatively coupled to said crank shaft for generating a rotational angle position signal representing the position of said piston of said internal combustion engine determinable in terms of the rotational angle position of said crank shaft,
   ignition enabling signal generating means coupled to said rotational angle position signal generating means and responsive to said rotational angle position signal for generating said ignition enabling signal at an ignition timing associated with the rotational speed of said internal combustion engine, and
   ignition enabling means for determining an allowable ignition timing range for said internal combustion engine in terms of an allowable rotational angle range of said crank shaft for enabling application of said ignition enabling signal to said spark plug driving means only during said allowable rotational angle range
   said ignition enabling means comprising
   a rotating member coupled to said crank shaft,
   rotational angle range determining means for determining said allowable rotational angle range of said rotating member for generating an allowable rotational angle range signal, and
   logical product evaluating means coupled to said ignition enabling signal generating means and to said rotational angle range determining means for evaluating a logical product of said ignition enabling signal and said allowable rotational angle range signal for providing a logical product signal to said spark plug driving means,
   trigger pulse signal generating means for preventing occurrences of misfire cycles wherein an ignition enabling signal is not applied to said spark plug driving means, said trigger pulse generating means coupled to said rotational angle range determining means and responsive to a trailing edge of said allowable rotational angle range signal for generating a trigger pulse signal, and
   logical sum evaluating means coupled to said trigger pulse signal generating means and to said logical product evaluating means for evaluating a logical sum of said trigger pulse signal and said logical product signal, said logical sum evaluating means connected for providing a logical sum signal to said spark plug driving means thereby generating an alternative ignition enabling signal for application to said spark plug driving means in cycles wherein said ignition enabling signal occurs outside of said allowable ignition timing range and is blocked by said ignition enabling means from application to said spark plug driving means,
   said logical sum evaluating means comprising OR gate means having a first input terminal connected to said trigger pulse signal generating means, a second input terminal connected to an output of said logical product evaluating means, and an output terminal for providing said alternate ignition enabling signal to said spark plug driving means for causing ignition only during said rotational angle range or in response to said trigger pulse signal, thereby preventing occurrences of misfire cycles,
   wherein said OR gate means is connected for providing on said output terminal a logical sum signal representing a logical sum of said trigger pulse signal and said logical product signal to said spark plug driving means.

4. An ignition control system of an internal combustion engine comprising:
   a spark plug mounted to a cylinder of an internal combustion engine, said cylinder slidably receiving a piston coupled to a crank shaft,
   spark plug driving means coupled to said spark plug and responsive to an externally applied ignition enabling signal for electrically driving said spark plug for causing ignition in said cylinder,
   rotational angle position signal generating means operatively coupled to said crank shaft for generating a rotational angle position signal representing the position of said piston of said internal combustion engine determinable in terms of the rotational angle position of said crank shaft,
   ignition enabling signal generating means coupled to said rotational angle position signal generating means and responsive to said rotational angle position signal for generating said ignition enabling signal at an ignition timing associated with the rotational speed of said internal combustion engine, and
   ignition enabling means for determining an allowable ignition timing range for said internal combustion engine in terms of an allowable rotational angle range of said crank shaft for enabling application of said ignition enabling signal to said spark plug driving means only during said allowable rotational angle range
   said ignition enabling means comprising
   a rotating member coupled to said crank shaft,
   rotational angle range determing means for determining said allowable rotational angle range of said rotating member for generating an allowable rotational angle range signal, and
   logical product evaluating means coupled to said ignition enabling signal generating means and to said rotational angle range determining means for evaluating a logical product of said ignition enabling signal and said allowable rotational angle range signal for providing a logical product signal to said spark plug driving means,
   trigger pulse signal generating means for preventing occurrences of misfire cycles wherein an ignition enabling signal is not applied to said spark plug driving means, said trigger pulse generating means coupled to said rotational angle range determining means and responsive to a trailing edge of said allowable rotational angle range signal for generating a trigger pulse signal, and logical sum evaluating means coupled to said trigger pulse signal generating means and to said logical product evaluating means for evaluating a logical sum of said trigger pulse signal and said logical product signal, said logical sum evaluating means connected for providing a logical sum signal to said spark plug driving means thereby generating an alternative ignition enabling signal for application to said spark plug driving means in cycles wherein said ignition enabling signal occurs outside of said allowable ignition timing range and is blocked by said ignition enabling means from application to said spark plug driving means wherein said trigger pulse signal generating means is operable for generating said trigger pulse signal upon detection of the trailing edge of said allowable rotational range signal, thereby providing said trigger pulse signal coincidentally with or subsequently to an occurrence of said logical product signal when said ignition enabling signal occurs within said allowable rotational angle range and enabling said spark plug driving means instead of said logical product signal when said ignition enabling signal occurs outside of said allowable rotational angle range.

5. An ignition control system of an internal combustion engine in accordance with claim 4, wherein said predetermined time period for providing a delayed signal by said delay means is selected such that said delayed signal is generated at a minimum advanced angle necessary for rotation of said internal combustion engine at an idling rotational speed.

6. An ignition control system of an internal combustion engine in accordance with any one of claims 4 or 5, wherein said rotating member comprises an allowable rotational angle range determinable member for defining said allowable rotational angle range, and said rotational angle range determining means comprises a sensor for detecting said allowable rotational angle range determinable member.

7. An ignition control system of an internal combustion engine in accordance with claim 4 wherein said logical sum evaluating means comprises OR gate means having a first input terminal connected to said delay means, a second input terminal connected to an output of said logical product evaluating means, and an output terminal for providing said alternate ignition enabling signal to said spark plug driving means for causing ignition only during said rotational angle range or in response to said delayed signal, thereby to prevent occurrences of misfire cycles.

8. An ignition control system of an internal combustion engine in accordance with claim 7 wherein said OR gate means is connected for providing on said output terminal a logical sum signal representing a logical sum of said trigger pulse signal and said logical product signal to said spark plug driving means.

* * * * *